United States Patent [19]

Tohara

[11] Patent Number: 5,724,608
[45] Date of Patent: Mar. 3, 1998

[54] MEDICAL IMAGE SYSTEM USING DUAL ADDRESS GENERATORS TO ALLOW CPU ACCESSED THREE-DIMENSIONAL BODY IMAGE DATA IN ACCORDANCE WITH ONE-DIMENSIONAL STORAGE ADDRESS IN DUAL MEMORIES SIMULTANEOUSLY

[75] Inventor: Hisanori Tohara, Ootawarashi, Japan

[73] Assignee: Kabushiki Kaisha Toshiba, Kanagawa-ken, Japan

[21] Appl. No.: 673,596

[22] Filed: Jul. 1, 1996

Related U.S. Application Data

[63] Continuation of Ser. No. 959,098, Oct. 9, 1992, abandoned.

[30] Foreign Application Priority Data

Oct. 11, 1991 [JP] Japan .................. 3-263462

[51] Int. Cl.$^6$ .................................. G06F 13/00
[52] U.S. Cl. .................. 395/827; 395/824; 395/840
[58] Field of Search ................. 382/41; 395/492, 395/515, 290, 827, 824, 840; 340/726; 345/200; 364/521

[56] References Cited

U.S. PATENT DOCUMENTS

| | | | |
|---|---|---|---|
| 4,103,331 | 7/1978 | Thacker | 395/515 |
| 4,434,502 | 2/1984 | Arakawa et al. | 382/41 |
| 4,467,412 | 8/1984 | Hoff | 395/290 |
| 4,491,834 | 1/1985 | Oguchi | 340/726 |
| 4,511,962 | 4/1985 | Machida et al. | 395/492 |
| 4,606,066 | 8/1986 | Hata et al. | 382/41 |
| 4,633,416 | 12/1986 | Walker | 364/521 |
| 4,644,495 | 2/1987 | Crane | 345/200 |
| 4,790,025 | 12/1988 | Inoue et al. | 382/41 |
| 4,864,629 | 9/1989 | Deering | 382/34 |
| 4,885,703 | 12/1989 | Deering | 395/122 |
| 4,985,848 | 1/1991 | Pfeiffer et al. | 395/164 |
| 5,124,842 | 6/1992 | Honda et al. | 359/561 |
| 5,249,267 | 9/1993 | Osaki | 395/166 |
| 5,263,135 | 11/1993 | Dei | 395/163 |

*Primary Examiner*—Thomas C. Lee
*Assistant Examiner*—Le Hien Luu
*Attorney, Agent, or Firm*—Finnegan, Henderson, Farabow, Garrett & Dunner, L.L.P.

[57] ABSTRACT

In an image data processing apparatus such as an X-ray imaging system, a simple address calculation is achieved. The image data processing apparatus includes: a first storage unit for storing image data; a calculation unit for performing a predetermined calculation with respect to the image data read out from the first storage unit, thereby to output calculated image data and for producing first address data about the calculated image data; and a first address generating unit for generating second address data suitable for accessing the first storage unit based upon the first address data outputted from the calculation unit.

11 Claims, 14 Drawing Sheets

| ADDRESS DATA | INTERPORATION COEFFICIENTS | |
|---|---|---|
| 2 | 0.7 | (1−0.3) |
| 3 | 0.3 | |
| 2 | 0.2 | (1−0.8) |
| 3 | 0.8 | |

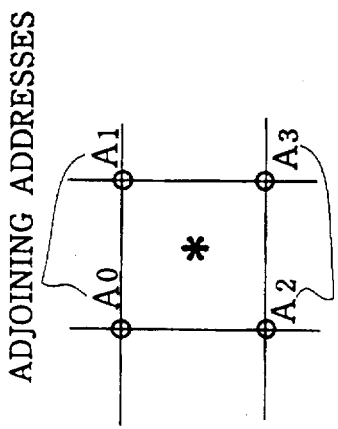
FIG.11
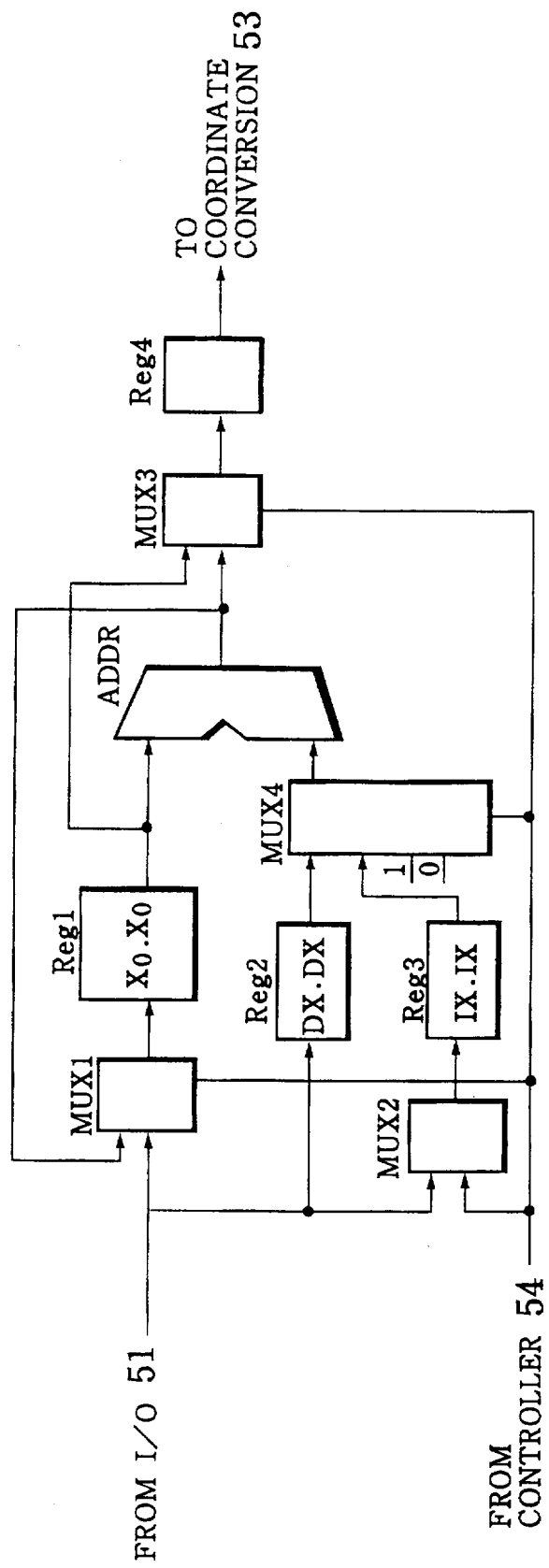
FIG.12  X-COORDINATE BLOCK 521

FIG.16
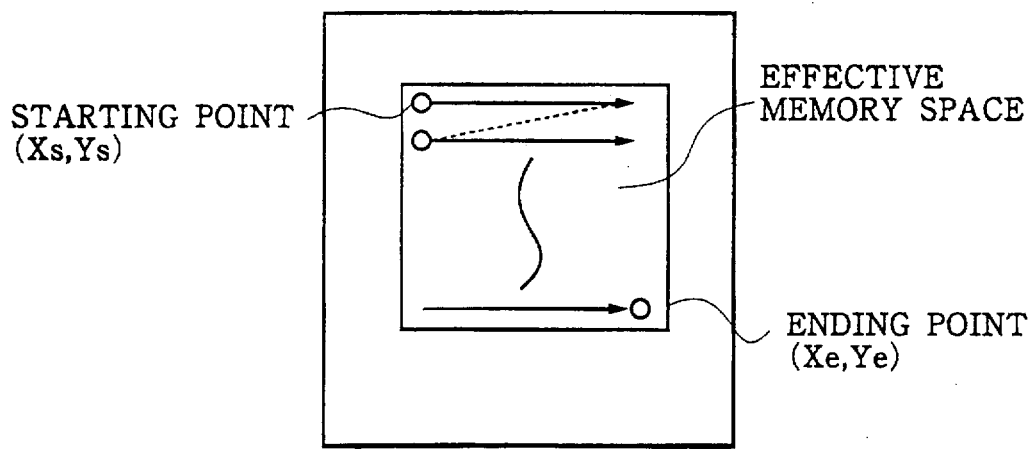
STARTING POINT (Xs,Ys)
MEMORY 15
EFFECTIVE MEMORY SPACE
ENDING POINT (Xe,Ye)
FIG.17A
| CYCLE "S" | DISPLACEMENT "P" |
|---|---|
|  | (X,Y,Z) |
| CYCLE1 | (0,0,0) |
| CYCLE2 | (−1,0,0) |
| CYCLE3 | (1,0,0) |
| CYCLE4 | (0,−1,0) |
FIG.17B
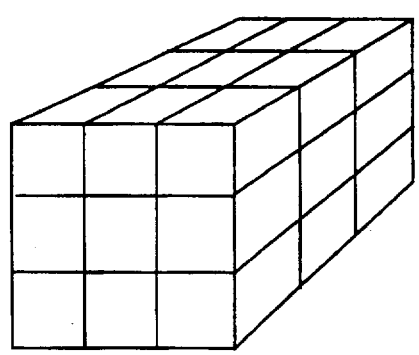

MEDICAL IMAGE SYSTEM USING DUAL ADDRESS GENERATORS TO ALLOW CPU ACCESSED THREE-DIMENSIONAL BODY IMAGE DATA IN ACCORDANCE WITH ONE-DIMENSIONAL STORAGE ADDRESS IN DUAL MEMORIES SIMULTANEOUSLY

This application is a continuation of application Ser. No. 07/959,098, filed Oct. 9, 1992, now abandoned.

BACKGROUND OF THE INVENTION

1. Field of the Invention

The present invention generally relates to an image data processing apparatus and an address generator included in such an image data processing apparatus. More specifically, the present invention is directed to an address generator capable of shortening overhead time of a program execution employed in a medical imaging system such as an X-ray CT (computerized tomographic) imaging system and an MR (magnetic resonance) imaging system, while producing a slice image of a biological body under medical examination at a desirable slice position, and also a 3-dimensional image thereof. Also, the present invention is directed to an image processing apparatus including such an address generator capable of reducing the overhead time.

2. Description of the Prior Art

In the conventional medical imaging systems such as an X-ray CT imaging apparatus and an MR imaging apparatus, either a general-purpose CPU (central processing unit) and also a general-purpose DSP (digital signal processor), or a specialized calculator has been employed to produce a slice image of a biological body under medical examination at an arbitrary slice plane from a series of slice images thereof, and a 3-dimensional image by way of the threshold value processing method. In these conventional image data processing manners, a series of slice images have been stored in the memory with only the 1-dimensional address, and the very complex address calculations containing also the complex and large program-processing operation executed by the CPU, DSP, or the specialized calculator are required in order to produce the slice image and the 3-dimensional image at an arbitrary slice plane.

Then, as previously described, the process time required for performing the address calculation to produce the slice image and the 3-dimensional image of the arbitrary slice of the patient, is not negligibly short as the overhead time. In the worst case, this overhead time becomes several times longer than the time to form such an image. For instance, assuming now that a 3-dimensional offset address for a memory is defined as "BASE" (starting point of memory address), when a conversion formula of vector addresses X, Y, Z;

$$A(Pn, Qn, Rn) = BASE + Pn + Qn*Lx + Rn*Lx*Ly$$

is executed by utilizing the CPU only, 5 steps are required. Even if such a conversion formula is executed by using the DSP equipped with the address generator, 3 steps are needed since this DSP has no multiplication function. Then, the process time of these step numbers is required for the respective points. Moreover, if the region judgement of the address space is executed by way of the CPU and DSP, 1 to 2 steps are additionally required, resulting in long overhead time.

Also, in accordance with the conventional image data processing method, there is no operation to generate the interpolation coefficient in the same cycle with the address calculation.

SUMMARY OF THE INVENTION

The present invention has been made in an attempt to solve the above-described problems, and therefore has an object to provide an image data processing apparatus capable of shortening process time required for executing an address calculation to form a slice image and a 3-dimensional image of an arbitrary slice plane in a biological body under medical examination.

Another object of the present invention to provide an address generator for generating an address required to process image data and/or to execute a data access operation in order to simplify an image processing software.

To achieve these objects, an image data processing apparatus, according to the aspect of the present invention, comprises:

first storage means (15) for storing image data;

calculation means (1) for performing a predetermined calculation with respect to the image data read out from the first storage means (15), thereby to output calculated image data, and for producing first address data about the calculated image data; and first address generating means (10) for generating second address data suitable for accessing said first storage means (15) based upon the first address data outputted from the calculation means (1).

According to another aspect of the present invention, an address generator comprises:

a coordinate data producing unit (52) for producing a vector address and addresses adjoining to the vector address in response to initial parameter data;

a coordinate data converting unit (53) for converting said vector address and said adjoining addresses into at least one-dimensional vector address; and a control unit (54) for controlling a displacement of the one-dimensional vector data obtained from the coordinate data converting unit (53).

BRIEF DESCRIPTION OF THE DRAWINGS

The above-described objects and other novel feature of the present invention may be understood by reading the following detailed description with reference to the accompanying drawings, in which:

FIG. 11 pictorially represents addresses positioned adjoining a two-dimensional address required to calculate an interpolation coefficient;

FIG. 12 is an internal circuit block diagram of the X-coordinate block 521 employed in the address generator 5;

FIG. 16 explains a self-loop function of the address generator; and

FIGS. 17A and 17B pictorially show a designation method for address direction.

DETAILED DESCRIPTION OF THE PREFERRED EMBODIMENTS

BASIC ARRANGEMENT OF IMAGE DATA PROCESSING APPARATUS

Generally, image data processed in the field of medical instruments may include a number of tomographic images associated with each other in order to represent a three dimensional image. The associated data is stored in a memory in sequential addresses. On the other hand, a user usually does not designate exact addresses in the memory but only designates necessary data with a three dimensional term.

The calculation for converting three dimensional addresses to corresponding sequential addresses in the memory conventionally takes much time. The present invention provides medical image data processing apparatus in which specific hardware is dedicated to perform address conversion calculations thereby improving the performance of the apparatus.

Figure 1:
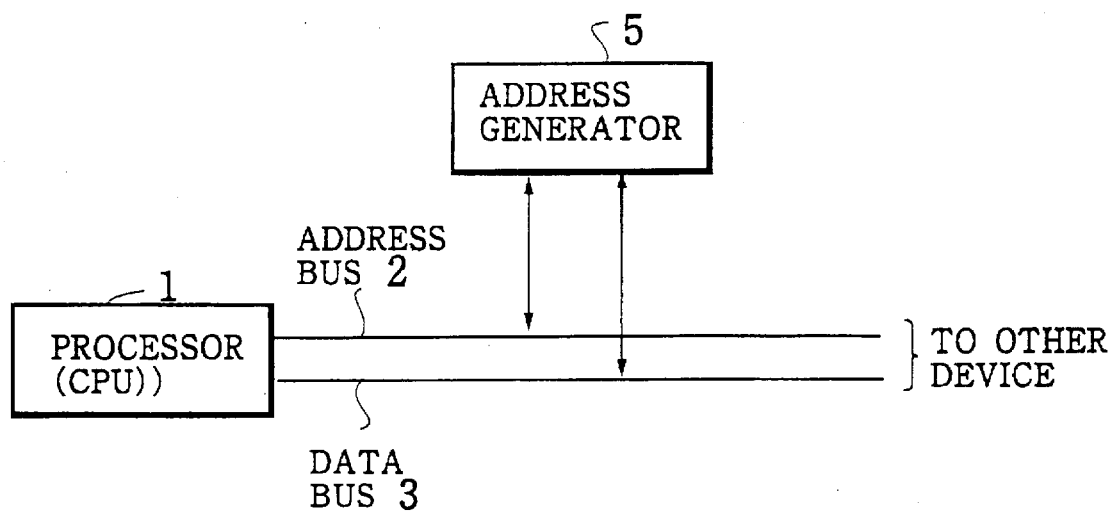
FIG. 1 is a schematic block diagram for showing an example of a mutual connection between an address generator and an image data processing apparatus according to the present invention.

In FIG. 1, there is shown a basic arrangement of an image data processing apparatus according to the present invention. In this basic arrangement, an image data processing unit I including a calculation unit (not shown in detail) such as a CPU (central processing unit) is employed. This processing unit 1 is connected via an address bus 2 and a data bus 3 to an address generator 5. In response to data supplied from the processing unit 1 via the data bus 2, address data is produced from the address generator 5 and outputted via the address bus 3 to other device (not shown). In accordance with the present invention, this image data processing unit 1 may be constructed of a general-purpose DSP (digital signal processor), specialized CPU, DSP or calculator (for instance, a bit-slice type calculator). As a data supplied from the processing unit 1 via the data bus 3, either an initial parameter, or address coefficient data may be utilized. Furthermore, as the address data generated from the address generator 5, various addresses may be generated from this address generator whose circuit arrangement is properly designed, for instance, 1-dimensional, 2-dimensional and 3-dimensional addresses, an arbitrary function address, or a filtering address.

STORAGE CONDITION OF IMAGE DATA

Figure 2:
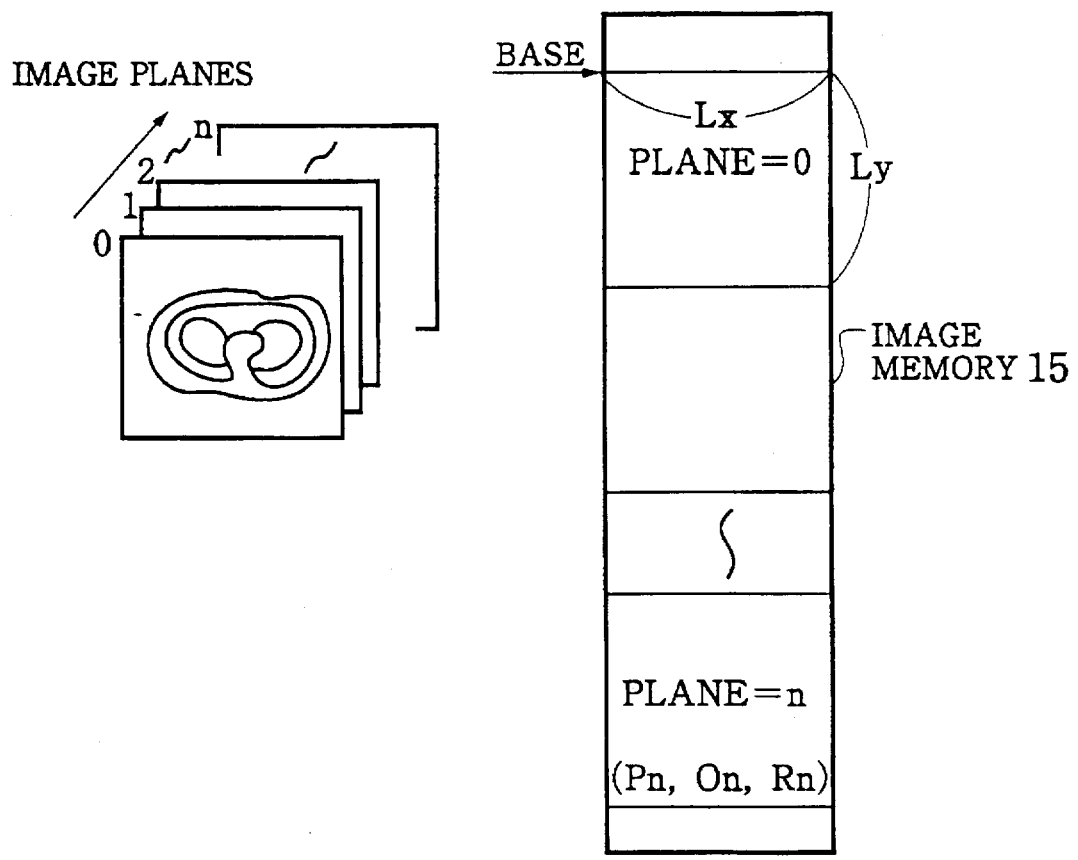
FIG. 2 schematically illustrates an arranging condition of image data within an image memory.

FIG. 2 pictorially shows a storage condition of image data within an image memory 15 (will be discussed later). In this image memory 15, image data produced from an X-ray CT (computerized tomographic) imaging apparatus and an MR (magnetic resonance) imaging apparatus has been stored as a data series having one-dimensional address.

When, for instance, either a MPR (multiplaner reconstruction), or 3-dimensional image representation is performed, an access address (namely 1-dimensional address) with respect to the data series stored in the image memory 15 may be determined by executing the following address conversion formula (1):

$$A(Pn, Qn, Rn) = BASE + Pn + Qn*Lx + Rn*LX*Ly \qquad (1)$$

where symbol "BASE" indicates an offset address of the image memory 15. In this case, it should be assumed that the below-mentioned formula (2) is satisfied:

$$A(Pn+1, Qn+1, Rn+1) = A(Pn+dP, Qn+dQ, Rn+dR) \qquad (2)$$

In the above-described formulae (1) and (2), symbols BASE, Po, Ro, Rn, Qn, dP, dQ, dR, Lx and Ly are data (initial data, parameters) given by the CPU 1 to the address generator 1. The address conversion formula 1 is calculated by way of the pipeline operation by the address generator 5.

FIRST IMAGE DATA PROCESSING APPARATUS

Figure 3:
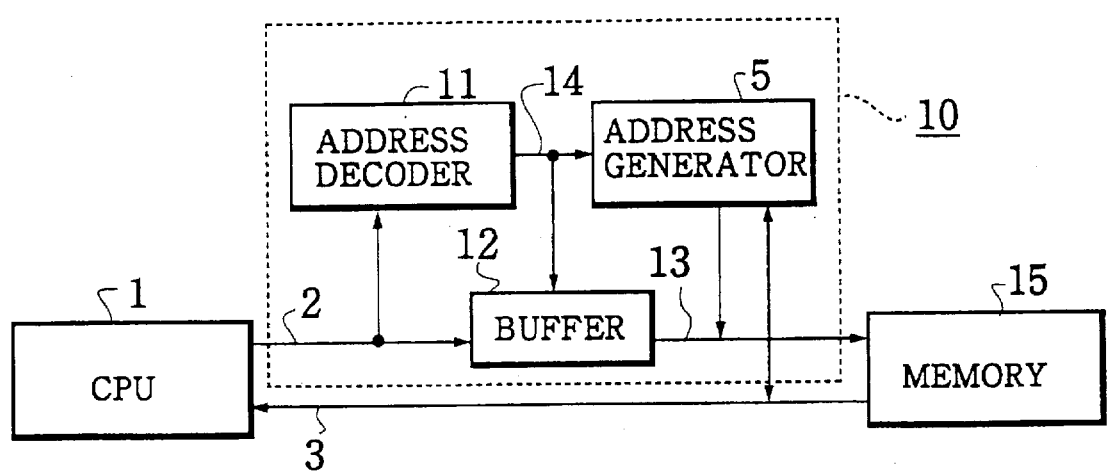
FIG. 3 is a schematic block diagram for showing a major arrangement of an image data processing apparatus according to a first preferred embodiment of the present invention.

FIG. 3 schematically shows a major circuit arrangement of an image data processing apparatus according to a first preferred embodiment of the present invention.

The first image data processing apparatus of FIG. 3 is mainly constructed of a CPU 1, and address generating unit 10 and a memory unit 15. These units 1, 10 and 15 are mutually connected via an address bus 2 and a data bus 2. More specifically, the address generating unit 10 includes an address generator 5, an address decoder 11 and a buffer 12. The buffer 12 is connected via another address bus 13 to the memory unit 15. In this first image data processing apparatus, the address decoder 11 selects an address of either the CPU 1, or the address generator 5 via an address selection line 14 to output the selected address to the buffer 12. Then, the address generator 5 generates an address based upon the data inputted from the CPU 1 and outputs this address to the address bus 13.

In the address generator 5, or example, the above-described formula (1) is calculated by executing a pipeline operation. The CPU 1 sends the address of the address generator 5 to the address decoder 11 in such a manner that the calculation of this formula (1) is performed by the address generator 5 and thus the 1-dimensional address can be produced by this address generator 5. These operations represent such a result similar to an assumption that the CPU 1 may drive the address bus 13. If a continuous vector address is indicated by, e.g., the formula (2), then the address generator 5 can continuously generate the 1-dimensional address.

As previously explained, in accordance with the first image data processing apparatus, since the address generator 5 is employed as a source address and also the CPU 1 is employed as an output address, and vice versa, the access operation to the image memory 15 can be effectively executed.

Also, according to the first image data processing apparatus, based upon the address generated from the address generator 5, the CPU 1 may access the memory unit 15 functioning as the image memory. Therefore, for example, when the address generated by the address generator 5 corresponds to a 1-dimensional address, image data which has been stored in the image memory 15 as the data series having the 1-dimensional address may be read out from the image memory 15.

SECOND IMAGE DATA PROCESSING APPARATUS

Figure 4A:
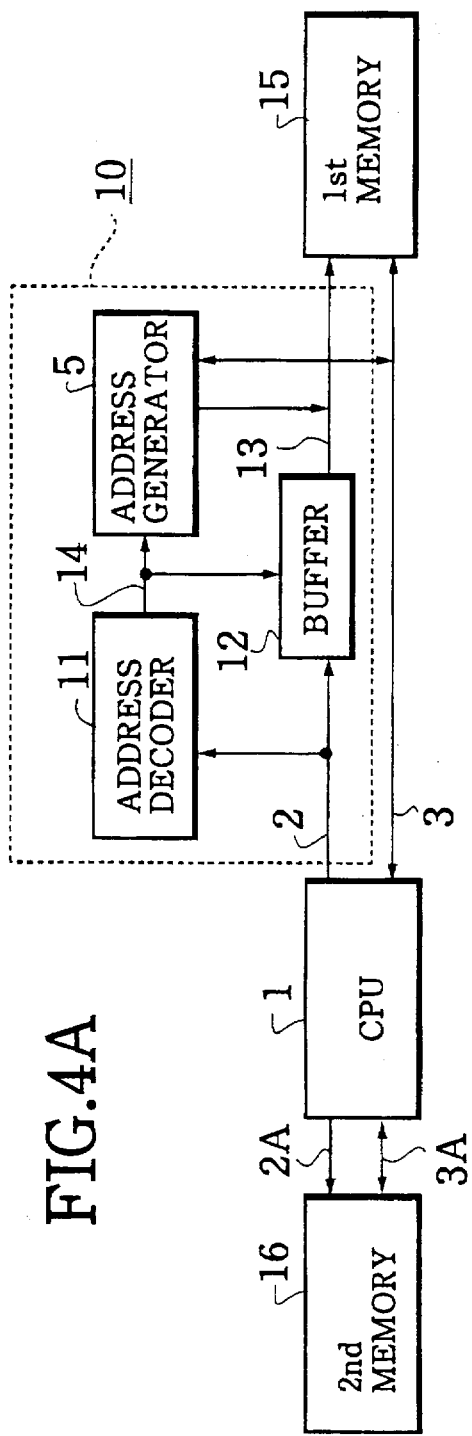
FIG. 4A is a schematic block diagram for representing a major arrangement of an image data processing apparatus according to a second preferred embodiment of the present invention, and FIG. 4B pictorially shows an address conversion operation effected in the second image data processing apparatus of FIG. 4A.

FIG. 4A shows a major arrangement of an image data processing apparatus according to a second preferred embodiment of the present invention. It should be noted that the same reference numerals shown in FIG. 3 will be employed as those for denoting the same circuit elements shown in the following figures, and no explanations thereof are made. As apparent from this arrangement, a major feature of the second image data processing apparatus is to newly employ a second image memory 16 in addition to the overall arrangement of the first image data processing apparatus shown in FIG. 3. The second image memory 16 is connected via a second address bus 2A and a second data bus 3A to the CPU 1.

In the second image data processing apparatus, the function of this first image memory 15 is similar to that of the first preferred embodiment, whereas the second image memory 16 executes the operation specific to the processing unit 1 (e.g., CPU and DSP). Both of the first image memory 15 and the second image memory 16 are simultaneously accessed via the CPU 1, and the first image memory 15 functions as an input device and also the second image memory 16 functions as an output device, and vice versa.

Figure 4B:
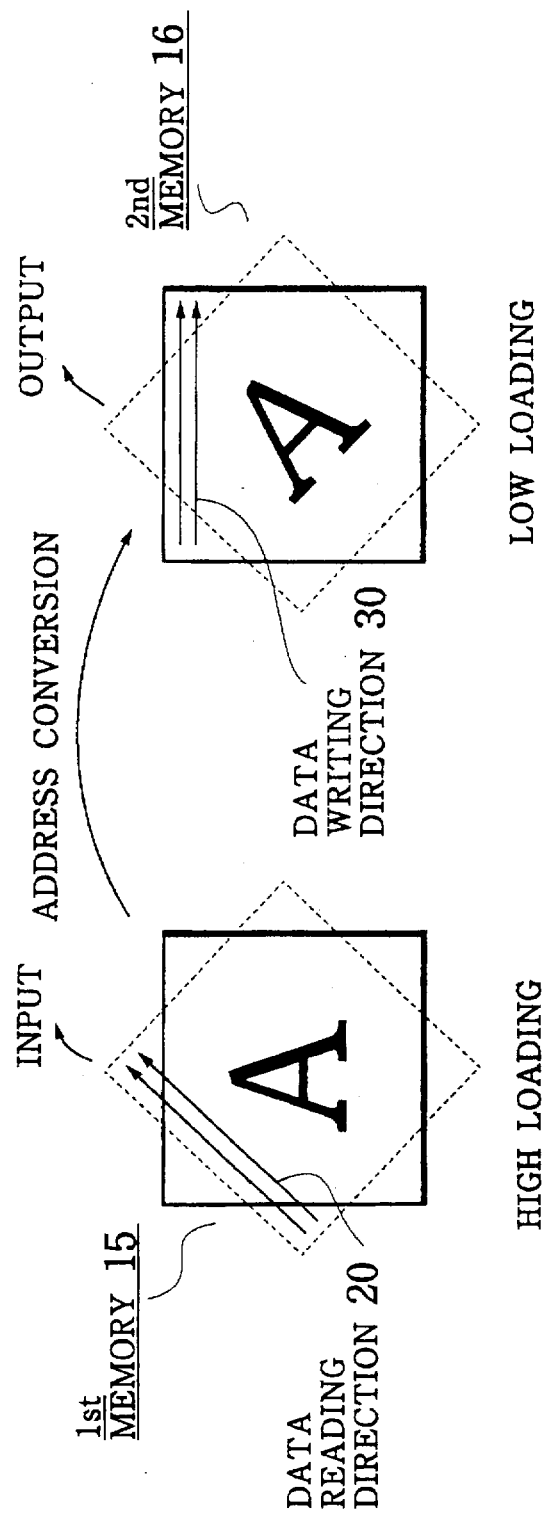

Another feature of the second image data processing apparatus is as follows: Since two image memories 15 and 16 are separately employed, the loading conditions required to generate the address data can be shared by the first and second image memories 15 and 16. That is to say, since the first image memory 15 is connected via the address generating unit 10 to the CPU 1, a very complicated address generation can be done (namely, high loading condition). To the contrary, since the second image memory 16 is directly connected to the CPU 1, a simple address generation can be executed (i.e., low loading condition). For a better understanding of these loading conditions, one example will now be described with reference to FIG. 4B. In FIG. 4B, it is assumed that image data "A" has been stored in the first image memory 15. Then, this image data "A" is read out from the first image memory 15 along a data reading direction 20 (i.e., inclined direction with respect to the original direction) under control of the CPU 1, resulting in a high loading condition loaded to this CPU 1. Subsequently, the read image data "A" is sequentially written into the second image memory 16 along a data writing direction 30, namely the normal data writing direction, under control of the CPU 1 (i.e., low loading condition loaded to this CPU 1). As a result, the address conversion is performed between the first and second image memories 15 and 16.

THIRD IMAGE DATA PROCESSING APPARATUS

Figure 5:
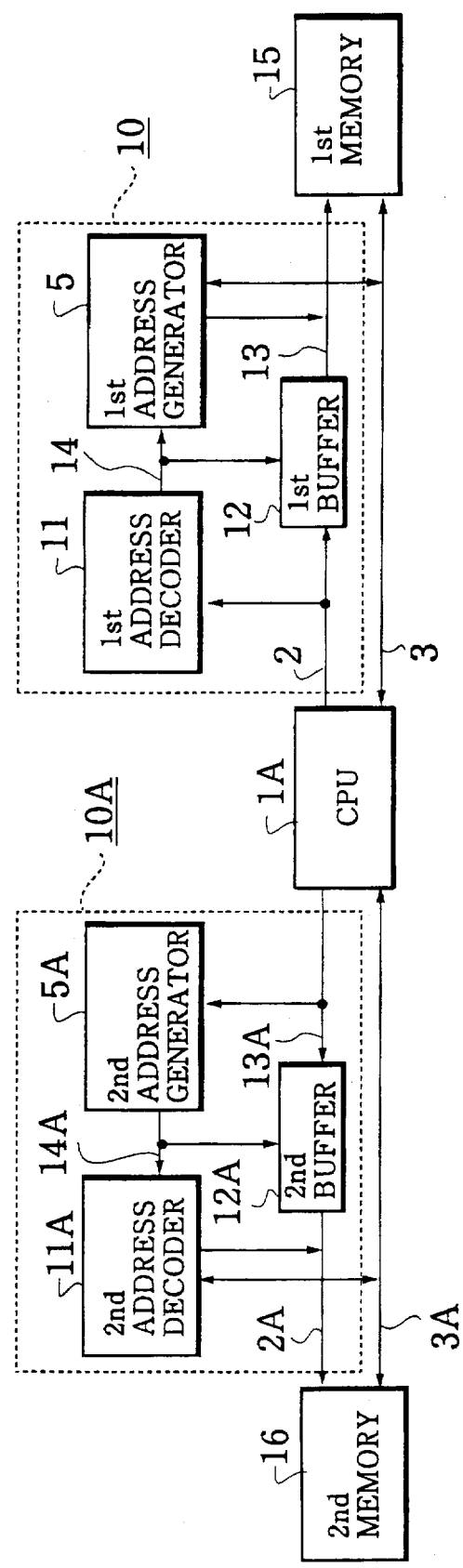
FIG. 5 is a schematic block diagram for indicating a major arrangement of an image data processing apparatus according to a third preferred embodiment of the present invention.

FIG. 5 shows a major arrangement of an image data processing apparatus according to a third preferred embodiment of the present invention. In this third image data processing apparatus, roughly speaking, a second address generating unit 10A is newly employed in addition to the third image data processing apparatus shown in FIG. 4A. This second address generating unit 10A is connected between a CPU 1A and the second image memory 16. An internal circuit arrangement of the second address generating unit 10A is identical to that of the first address generating unit 10.

A major feature of the third image data processing apparatus is to generate address data by the first and second address generators 5 and 5A at each side of the first and second image memories 15 and 16. As a consequence, since the CPU 1A has no longer such an address generating function, as described in the previous first and second preferred embodiments, an internal arrangement of the CPU 1A can be made simpler than that of the CPU 1. In other words, the second address generating unit 10A is additionally connected between this CPU 1A and the second image memory 16.

FOURTH IMAGE DATA PROCESSING APPARATUS

Figure 6:
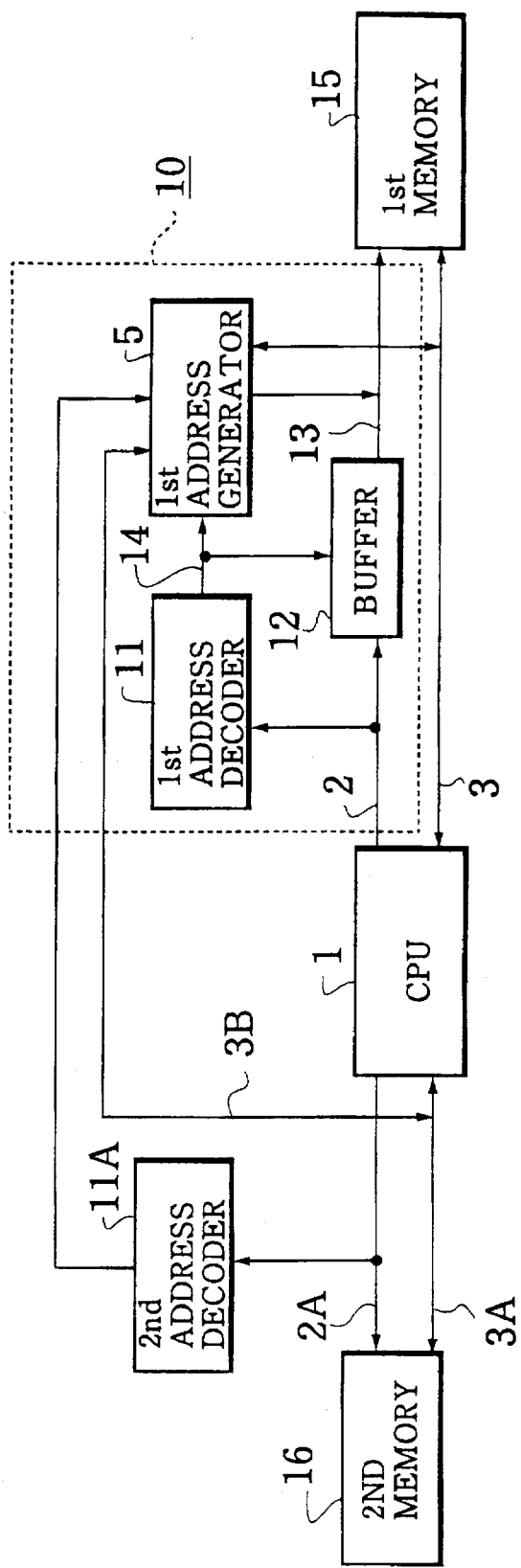
FIG. 6 is a schematic block diagram for showing a major arrangement of an image data processing apparatus according to a fourth preferred embodiment of the present invention.

In FIG. 6, there is shown a major arrangement of an image data processing apparatus according to a fourth preferred embodiment of the present invention. As obvious from FIGS. 3 and 6, two ports are newly provided at the side of the address generator in the first image data processing apparatus. Precisely speaking, a second image memory 16 is connected via a second address bus 2A and a second data bus 3A to the CPU 1, and also a second address decoder 11A is additionally connected between this CPU 1 and the first address generator 5 of the address generating unit 10 via the second address bus 2A. The second data bus 3A is also connected to the first address generator 5 via a third data bus 3B.

In accordance with the fourth image data processing apparatus, since both of the address data for the address generator 5 and the first image memory 15 are produced and also interpolation coefficients thereof (see FIG. 7) are produced, this CPU 1 accesses the data about the first image memory 15 and the interpolation coefficients as shown in FIG. 7.

Figures 7A, 7B:
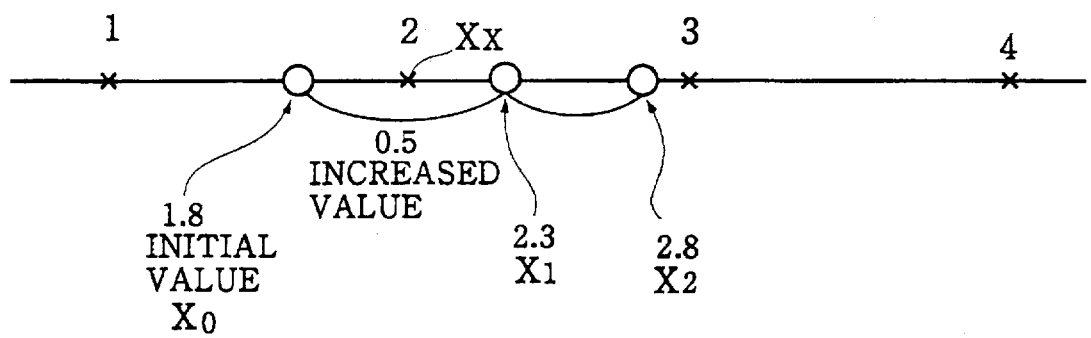
FIGS. 7A and 7B pictorially show a relationship between one-dimensional data arrangement and an interpolation coefficient.

FIG. 7A represents a relationship between one-dimensional data "Xx" and the interpolation coefficient. That is, FIG. 7A shows the generations of the interpolation coefficients with regard to the data "Xx" in one-dimensional representing method. In FIG. 7A, symbol "Xo" denotes an initial value (1.8), symbol "X1" shows a first increased value (2.3), and symbol "X2" indicates a second increased value (2.8), and numeral "0.5" is an increase for the initial value "Xo".

FIG. 7B represents address data outputted from the address generator 5 at a left side, and also the interpolation coefficients produced from the CPU 1 at a right side.

BASIC ARRANGEMENT OF ADDRESS GENERATOR

Figure 8:
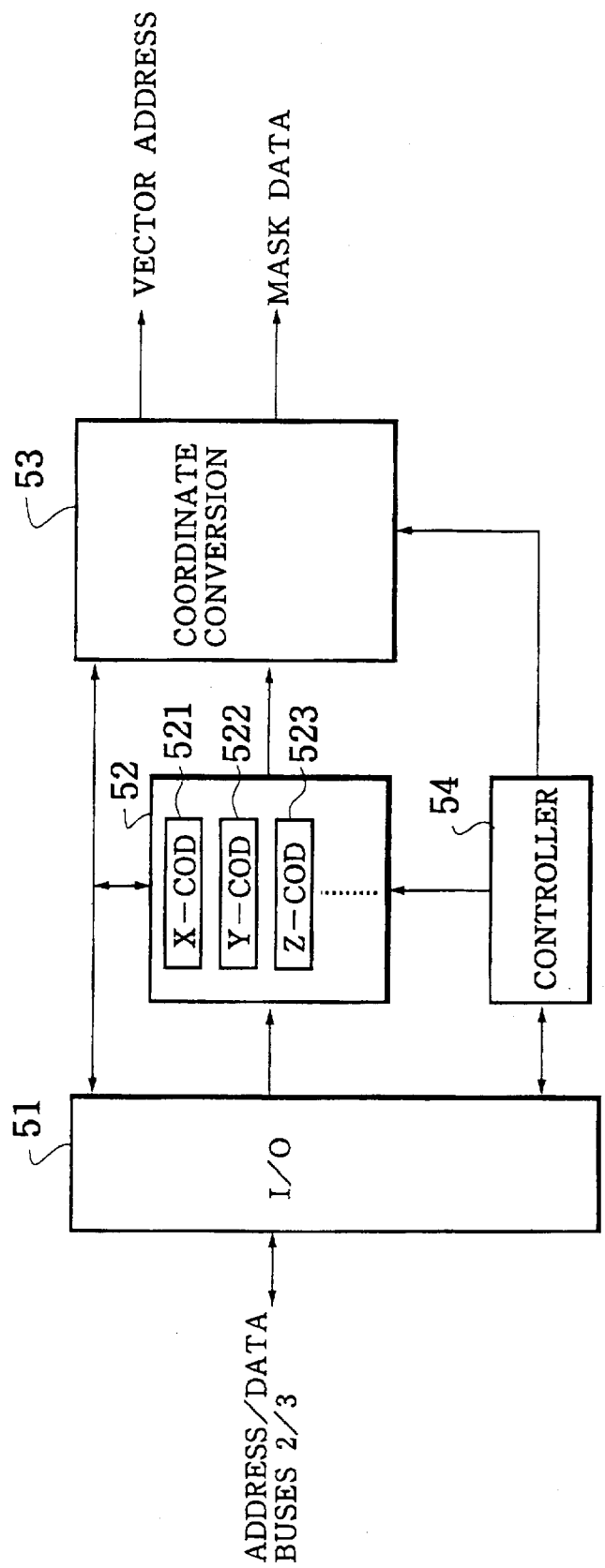
FIG. 8 is a schematic block diagram for showing a basic internal arrangement of the address generator represented in the FIG. 1.

FIG. 8 indicates a basic arrangement of the above-described address generator 5 employed in the first to fourth image data processing apparatuses according to the present invention.

Since this address generator 5 constitutes the major feature of the present invention, a detailed description thereof will now be made in addition to two practical address generators.

In the address generator 5 of FIG. 8, an input/output interface 51 is connected via the address bus 2 and data bus 3 to the CPU 1 (see FIG. 3–6), through which an initial parameter is set and internal data (e.g., data stored in an address register) is read. Furthermore, this address generator 5 includes a coordinate data producing unit 52 for producing a vector address and addresses near this vector address (namely, adjoining addresses) in accordance with the initial parameter; a coordinate conversion unit 53 for converting the vector address into one-dimensional address; and a control unit 54 for controlling all of those circuit elements 51, 52 and 53 to change displacement of the vector address.

In this address generator 5, the coordinate conversion unit 53 is so arranged that, for instance, 1 to 3-dimensional addresses, an arbitrary function address and a filtering address are produced. An access address is generated in each 1 cycle. For example, a 1-dimensional access address used to access data series stored in the first image memory 15 may be determined by the above-described formula 1 (will be described more in detail).

As shown in FIG. 8, the coordinate unit 52 is constructed of three blocks, namely an X-coordinate block 521, a Y-coordinate block 522, and a Z-coordinate block 523. Each of these X, Y and Z coordinate blocks 521 to 523 produces a vector calculation formula (3):

$$Xn + 1 = Xn + dX, \quad (3)$$
$$Yn + 1 = Yn + dY,$$
$$Zn + 1 = Zn + dZ$$

where symbols "Xn+1", "Yn+1" and "Zn+1" denote addresses of a point (n+1), and symbols Xn, Yn, Zn show addresses of a point (n).

It should be noted in this example that although the coordinate unit 52 of FIG. 8 generates the 1 to 3-dimensional addresses, the present invention is not limited thereto. For instance, if the coordinate unit 52 employs 4th coordinate block, a 4-dimensional vector address may be additionally produced.

For the sake of simplicity, this coordinate unit 52 is constructed of the 3-dimensional coordinate blocks 521 to 523.

In addition, both of the adjoining addresses (i.e., addresses near the vector address) used for a filtering operation and an interpolation address are generated from the coordinate unit 52. The adjoining addresses are produced in such a way that, for instance, addresses of Xn−1, Xn and Xn+1 ("n" being an integer) with respect to a point "X" are generated in a one-dimensional 3-point filter. It should be noted that 4-point adjoining addresses are required for the two-dimensional interpolation address as shown in FIG. 11 (will be discussed later).

As previously described, such an address conversion may be performed by utilizing a converting means set to the control unit 54 under control of the CPU 1. This converting means may be selected from a command/mode set value, or a conversion table.

FIRST PRACTICAL ADDRESS GENERATOR

Figure 9:
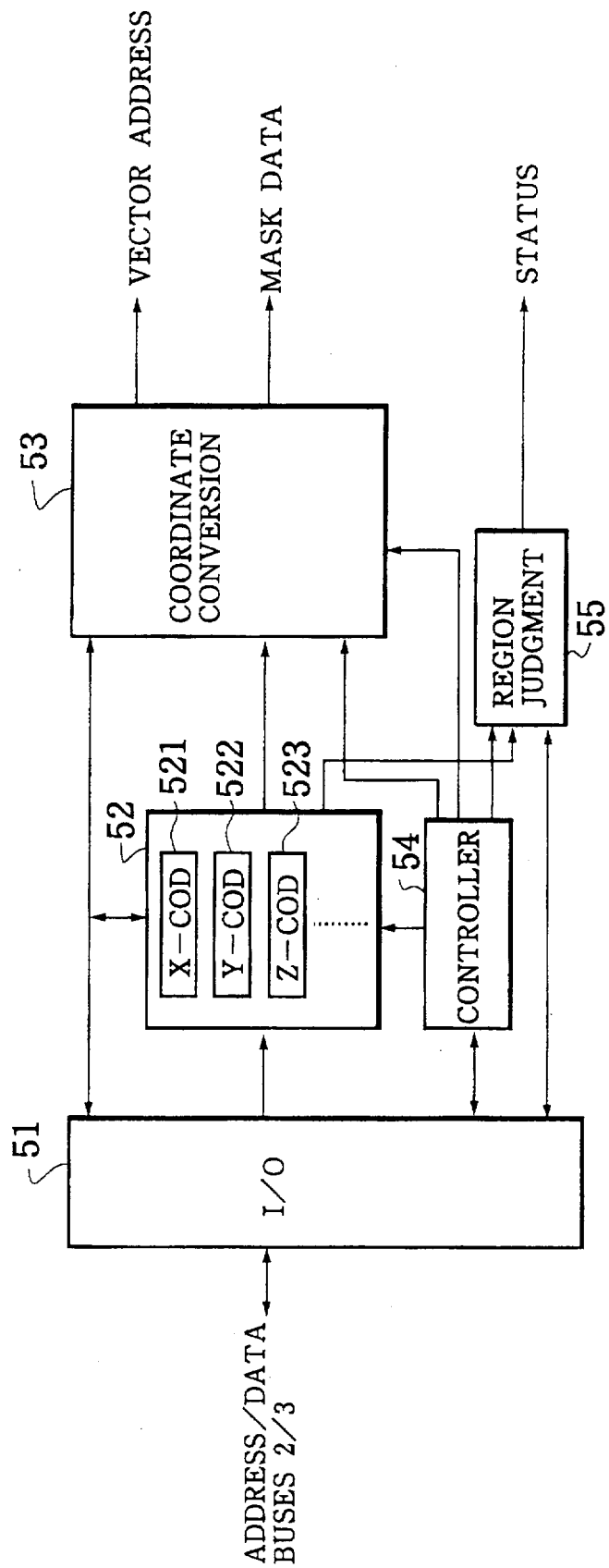
FIG. 9 is a schematic block diagram for indicating an internal arrangement of a first address generator of the present invention.

FIG. 9 indicates a first practical address generator 50A constructed in accordance with the basic address generators of FIG. 8. As apparent from comparison between FIG. 8 and FIG. 9, most circuit arrangement of this first practical address generator 50A is the same as that of the basic address generator 5. A region judgement unit 55 is newly employed. The region judgement unit 55 is connected to the I/O unit 51 and the coordinate unit 52 via the control unit 54. The region judgement unit 55 judges whether or not an address generated from the vector address and a predetermined threshold value is present within a region of interest (see FIG. 2, plane), and issues a status signal (status bit) indicative of the judgement result to the CPU 1 via the address bus 2, or 2A.

As explained above, in accordance with the feature of the first practical address generator 50A, the CPU i can recognize such a judgement result indicating whether or not the generated address is located within the region of interest. Also, this address region judgement result may be used as the condition for moving the vector address.

SECOND PRACTICAL ADDRESS GENERATOR

Figure 10:
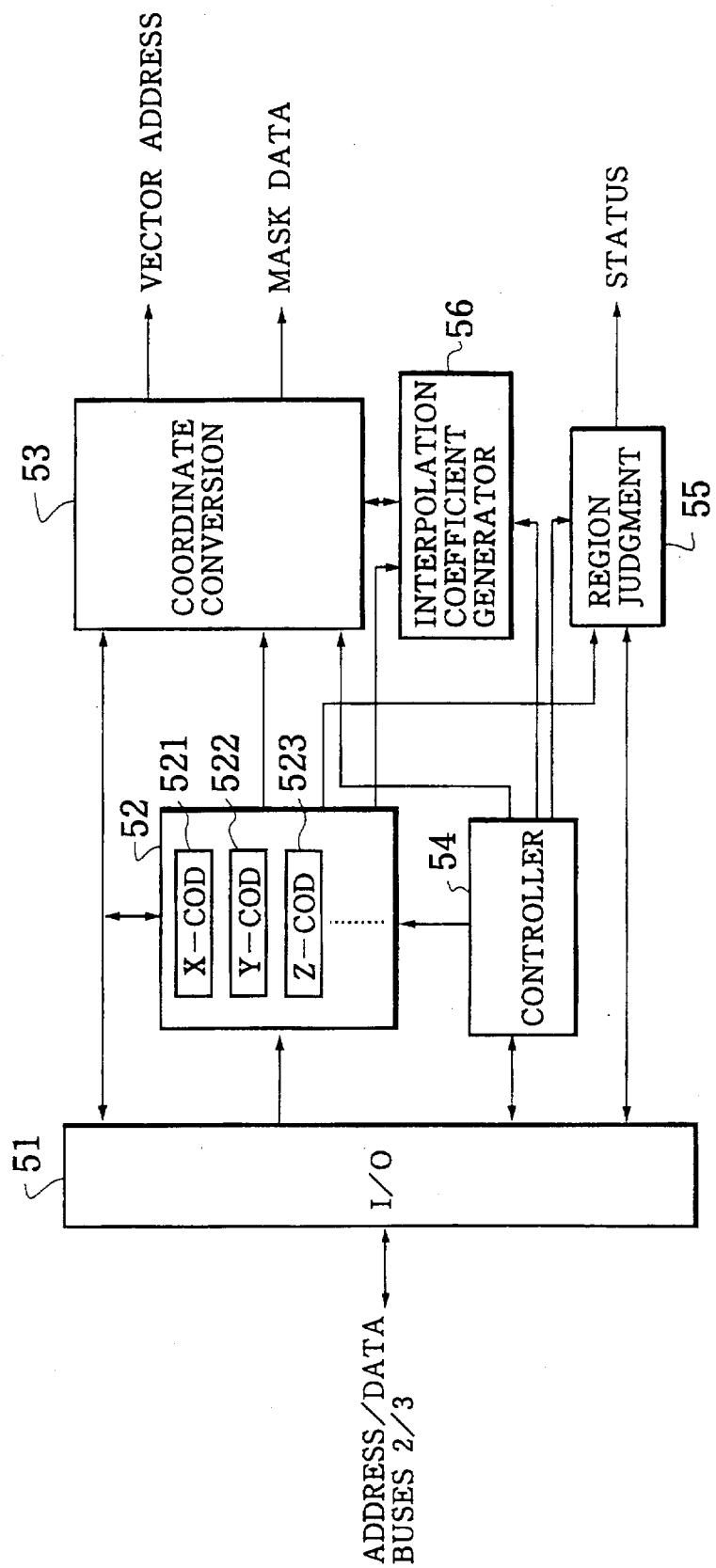
FIG. 10 is a schematic block diagram for showing an internal arrangement of a second address generator of the present invention.

FIG. 10 represents a second practical address generator 50B of the present invention. A major featured construction of this second practical address generator 50B is to newly employ an interpolation coefficient generator 56 in addition to the entire circuit arrangement of the first practical address generator 50A shown in FIG. 9. As shown in FIG. 12, a content "Xo.Xo" of a register "Reg1" corresponds to either an initial value, or a value obtained during a calculation. An output of this register "Reg1" is supplied via a multiplexer "MUX3" to a register "Reg4". In the below-mentioned formula (4), a left hand thereof corresponds to an output derived from the register "Reg4". A lower portion (decimal part) of this output ".Xo" becomes a desirable interpolation coefficient.

In accordance with the second practical address generator 50B, since the interpolation coefficient generator 56 is additionally employed, this second practical address generator 50B owns not only the above-described function of the first practical address generator 50A, but also such an additional function to generate the interpolation coefficient at the same cycle as the generated address.

INTERNAL CIRCUIT OF X-COORDINATE BLOCK 521

FIG. 12 shows an internal circuit of the above-explained X-coordinate block 521 employed in the coordinate unit 52 as shown in FIG. 8. It should be understood that in case of a 3-dimensional coordinate system, both of the Y-coordinate block 522 and the Z-coordinate block 523 have the similar internal circuits to this internal circuit.

In the X-coordinate block 521, an initial value "Xo.Xo" of the vector address is set into a first register "Reg 1". After the address generator 5 of FIG. 8 is brought into an operative state, a vector address for the next point will be obtained as follows:

$$Xo.Xo=Xo.Xo+Dx.Dx, \text{ otherwise } Xo=Xo.Xo+IX.IX \quad (4)$$

In this formula (4), symbol "Dx.Dx" denotes an increased value, or a decreased value. Based upon this value "Dx.Dx", both of a direction and a pitch of a vector are designated. Also, symbol "IX.IX" shows a displacement (conversion) coefficient for a filter or the like. This displacement coefficient may be designated in each cycle by using the I/O interface 51, or may be designated by way of a conversion (displacement) table of the control unit 54.

Referring back to the internal circuit of the X-coordinate block 521 shown in FIG. 12, an adder "ADDR" adds either the initial value or the (n−1)-th address with the value "DX.DX". A first multiplexer "MUX1" selects the setting operation to the register "Reg 1" into the initial value, or the updated value, whereas a second multiplexer "MUX2" selects that the value "IX.IX" is inputted from the I/O interface 51, or the control unit 54. A third multiplexer "MUX3" selects that the outputs from the X, Y and Z-coordinate blocks 521, 522, 523 of the coordinate unit 52 are used as the inputs of the adder "ADDR", or the outputs thereof, and also designates either post-increment or pre-increment.

INTERNAL CIRCUIT OF COORDINATE CONVERTING UNIT 53

Figure 13:
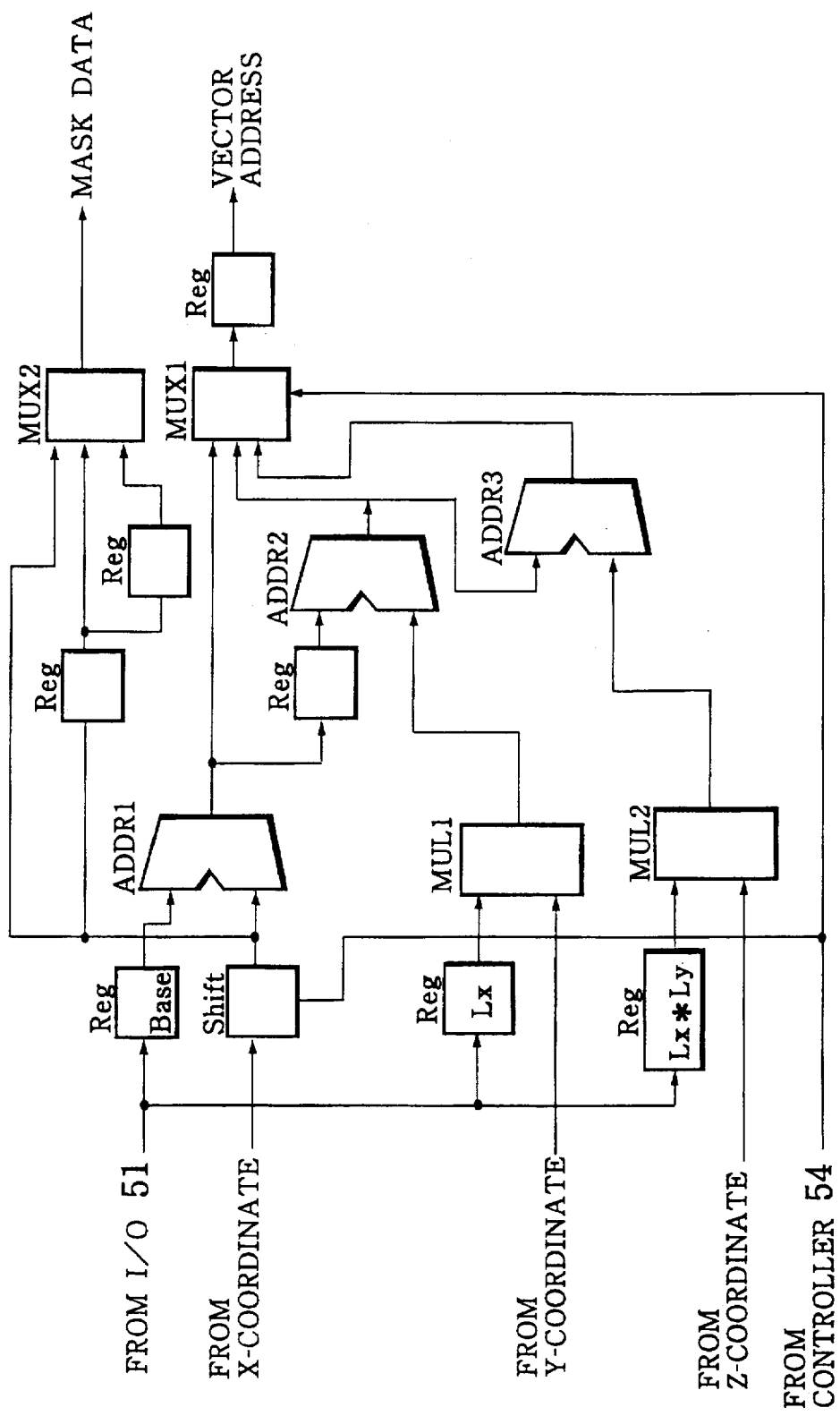
FIG. 13 is an internal circuit block diagram of the coordinate conversion unit 53 employed in the address generator 5.

FIG. 13 shows an internal circuit of the above-described coordinate converting unit 53. As previously explained, this coordinate converting unit 53 converts the X, Y and Z vector addresses into one-dimensional addresses, respectively.

In the internal circuit of FIG. 13, symbol "BASE" indicates an offset address for the image memory 15, or 16; symbol "Lx" denotes a pixel value along the X direction; and symbol "Lx*Ly" shows a pixel value of a 2-dimensional plane. Furthermore, a first multiplexer "MUL1" selects the 1, 2 and 3-dimensional addresses, and first to third adders "ADDR1", "ADDR2" and "ADDR3", and also the first multiplexer "MUL1" and a second multiplexer "MUL2" perform the calculation of the above-explained formula (1). A shifter "shift" shifts the X-coordinate address used for generating an address of binary data into, for instance, 1/16, 1/32 and so on.

The 1-dimensional address converted by the coordinate converting unit 53 is used as a memory address. Since the binary-coded data produced by the 3-dimensional image process is represented as 1 bit/pixel, 16 pixels or 32 pixels are accessed in the 16-bit or 32-bit access operation. In this case, the mask data is used which indicates whether the 16-bit or 32-bit data is valid, or invalidated. For instance, the lower 4 bits of the 16-bit data for the X-coordinate are used as this mask data. Also, the lower 5 bits of the 32-bit data are employed as this mask data. The bit discrimination of the binary-bit data is carried out by reading this mask data via the I/O interface 51 under control of the CPU 1, or by masking data with this mask data in an external circuit (not shown in detail).

INTERNAL CIRCUIT OF REGION JUDGEMENT UNIT 55

Figure 14:
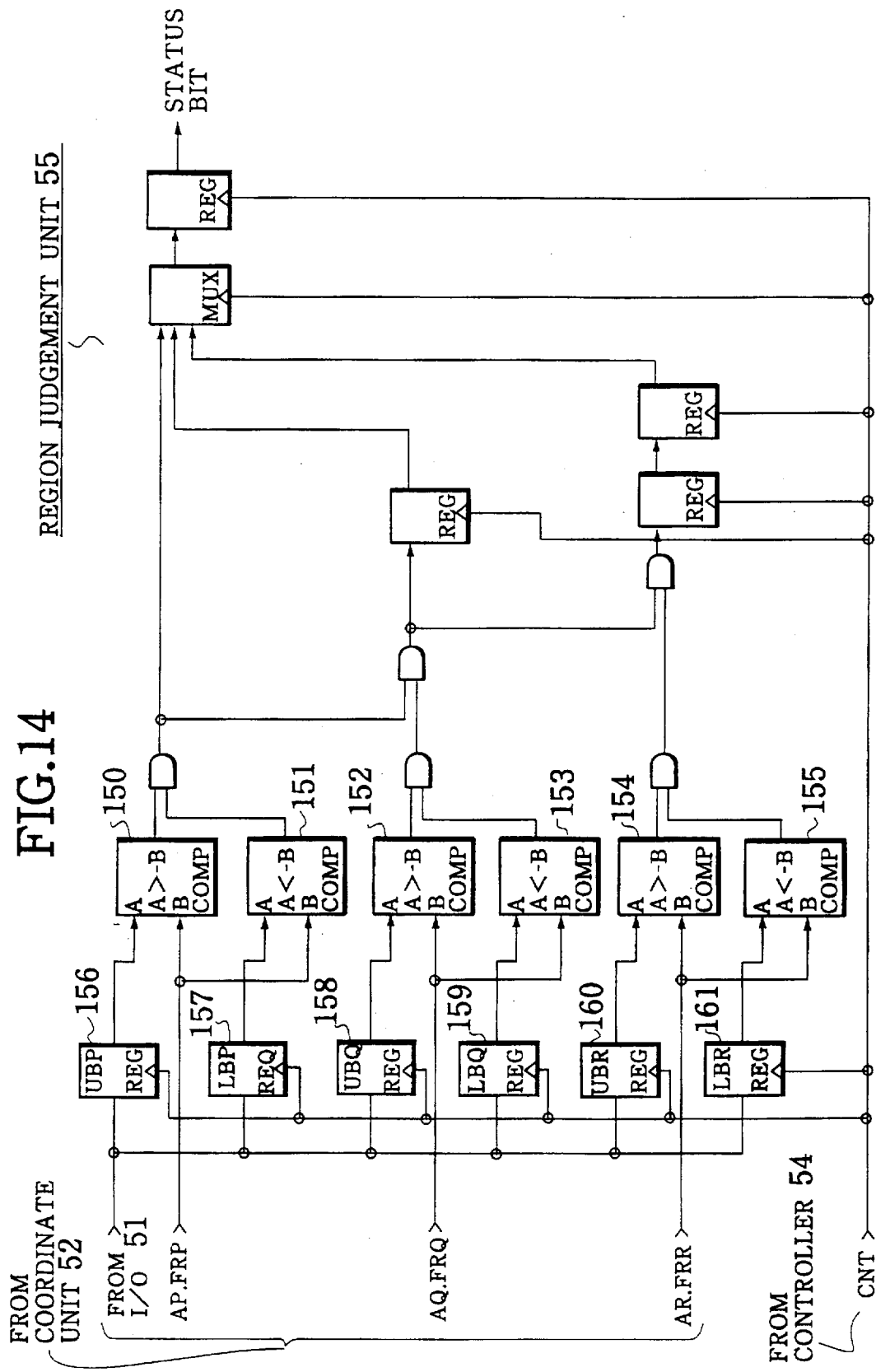
FIG. 14 is an internal circuit block diagram of the region judgement unit 55 employed in the address generator 5.

Referring back to the second practical address generator 50B, the function of the region judgement unit 55 will now be described more in detail with reference to an internal circuit thereof shown in FIG. 14. That is, the region judgement block 55 compares a boundary value previously set via registers 156-161 by the CPU 1 with an address to be generated in comparators 150-155, and then produces a status bit for indicating whether or not the generated address is located within the region. This status bit is used to judge the region of the one-directional vector address. This region judgement result is used also as the movement condition of the vector.

INTERNAL CIRCUIT OF INTERPOLATION COEFFICIENT GENERATOR 56

Figure 15A:
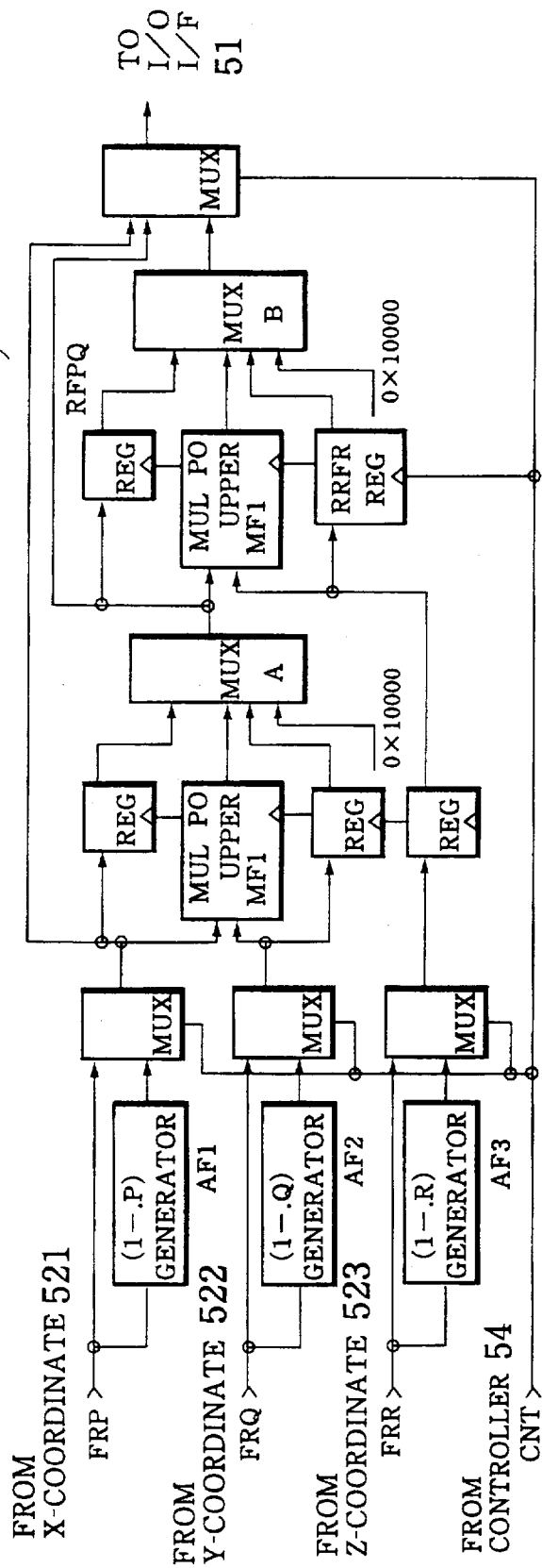
FIGS. 15A and 15B together is an internal circuit block diagram of the interpolation coefficient generator 56.
Figure 15B:
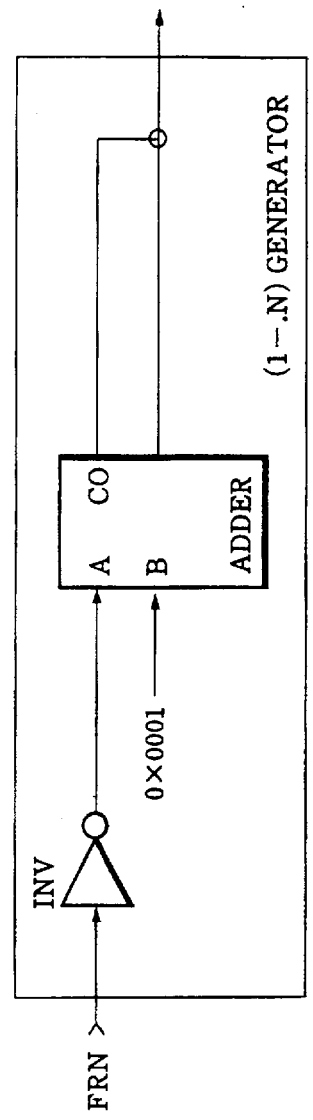

The interpolation coefficient generator 56 generates the interpolation coefficients for the respective one to three-dimensional addresses from the decimal part (e.g., ".Xo") of the respective X, Y and Z vector data generated from the X-coordinate block 521, Y-coordinate block 522 and Z-coordinate block 523. FIG. 15A shows an internal circuit of this interpolation coefficient generator 56, and FIG. 15B represents a detailed internal circuit of a generator employed in this coefficient generator 56.

In accordance with the second practical address generator 50B, this address generator is operated in the pipeline operation mode, so that the addresses, interpolation coefficients and mask data are outputted at each cycle. As a consequence, since the pipeline operation is automatically updated once a single address is produced, an extra memory is not required inside, or outside this address generator 50B.

SELF-LOOP FUNCTION

Alternatively, according to the present invention, a region to be produced may be set as a vector space into the address generator 5, so that the image memory 15 may be operated without setting the parameters from the CPU 1 every time the address generator 5 is operated, resulting in an establishment of a self-loop function. For instance, as illustrated in FIG. 16, if this self-loop function is employed, a required memory space may be sequentially accessed only by setting a starting address (Xs, Ys) and an ending address (Xe, Ye) within the two-dimensional address space.

MODIFICATIONS

The present invention is not limited to the above-described preferred embodiments, but may be modified, changed and substituted without departing from the technical scope and spirit of the present invention.

First, various internal arrangements of the address generators 5, 50A and 50B are realized as shown in FIGS. 8, 9 and 10. Alternatively, RAM, ROM and means for generating an arbitrary function may be used to construct these address generators.

Also, as a software to operate the image data processing apparatus of the present invention, no specific computer language (e.g., assembler) is required. When, for instance, a general-purpose CPU or DSP is employed as the data processing unit 1, the title of this device is merely stated in a computer software, resulting in a simple/easy software statement. Even when a bit slice type calculator is employed as the data processing unit 1, a software statement does not become complex.

Also, there are several methods, as indicated in FIGS. 17A and 17B, for designating the filtering address with respect to the 3-dimensional address spaces for X, Y and Z coordinates. For instance, as shown in FIG. 14A, in accordance with the setting method by the data processing unit in each cycle, displacement "P" (000), (−1, 0.0) ... (0, −1, 0) is set into the IX.IX register "Reg 3" of FIG. 12 in each cycle (1, 2, ... 4). Furthermore, as represented in FIG. 17B, in another method for setting a complex filter as a cube, e.g., a 3×3×3 cubic filter, this complex filter may be expressed by 32 bits, since 3×3×3=27 bits, when the filter points are represented in ON/OFF bit units. Similarly, if a 5×5×5 cubic filter is employed, this complex filter may be expressed by 125 bits, namely, since 125<128=32 bit×4, a cube may be expressed with multiplication of 32 bits.

As previously described in detail, according to the image data processing apparatus of the present invention, the address generator can be operated in the parallel mode with respect to the data processing unit. As a consequence, since the overhead time is considerably reduced, the total process time required for producing a slice image or a three-dimensional image at an arbitrary slice plane can be accordingly shortened.

Also, since the address generator may be considered as a 0-dimensional I/O device mapped in memory space of a CPU, in view of this CPU, and also the interpolation coefficients may be given as the coefficients of these mapping points, the software statement can be simplified. Accordingly, time required for developing such a software can be reduced, so that a total system development cost can be reduced.

Since the address generator of the present invention may be manufactured as an LSI, a total number of these components may be considerably reduced. As this address generator may be simply connected with the general-purpose CPU and DSP, the hardware construction may be made simple.

What is claimed is:

1. A medical image data processing apparatus comprising:
   first storage means for storing three-dimensional body image data in accordance with a one-dimensional storage address system characteristic to the apparatus;
   calculation means for producing three-dimensional first address data in accordance with a viewing address system based on three-dimensional spatial coordinates and for processing body image data read from the first storage means to generate a viewable image in accordance with the three-dimensional first address data;
   first address generating means coupled to said calculation means and said first storage means and responding to the three-dimensional first address data received from the calculation means to generate one-dimensional second address data structured in accordance with the storage address system to access body image data in the first storage means for readout to the calculation means for the viewable image;
   second address generating means coupled between said calculation means and a second storage means through a second bus; and
   said first and second storage means are simultaneously accessible by said calculation means.

2. An image data processing apparatus as claimed in claim 1, further comprising:
   a first address bus connecting said first address generating means and said calculation means and said first storage means; and
   a first data bus connecting said calculation means and said first storage means.

3. An image data processing apparatus as claimed in claim 2, further comprising:
   second storage means connected via a second address bus and a second data bus to said calculation means; and
   address decoding means connected between said first address generating means and said second storage means via said second address bus, said first address generating means generating both of said second address data and an interpolation coefficient of said second address data.

4. An image data processing apparatus as claimed in claim 2, wherein said first address generating means includes:
   a first address decoder connected to said first address bus, for selecting one of said first and second address data produced from said calculation means and said first address generating means;
   a buffer interposed between said calculation means and said first storage means on said address bus, for buffering said selected address data; and
   a first address generator for generating said second address data based on said first address data derived from said calculation means via said buffer.

5. The medical image data processing apparatus of claim 1, wherein said first address generating means further comprises:
   a coordinate data producing unit for producing a three-dimensional vector address representing three-dimensional body image data with addresses adjoining to the three-dimensional vector address in response to initial parameter data;
   a coordinate data converting unit for converting said three-dimensional vector address and said adjoining addresses into at least one-dimensional vector address data; and
   a control unit for controlling a displacement of the one-dimensional vector data obtained from the coordinate data converting unit.

6. An address generator as claimed in claim 5, further comprising:
   a region judgement unit for comparing said vector address produced from said coordinate data producing unit with a predetermined threshold value to judge whether or not said vector address is present within a region of interest, thereby to produce status data.

7. An address generator as claimed in claim 6, further comprising:
   an interpolation coefficient generator for generating an interpolation coefficient from a decimal part of said vector address.

8. An address generator as claimed in claim 5, wherein said coordinate data producing unit includes at least an X-coordinate block, a Y-coordinate block, and a Z-coordinate block, whereby three-dimensional vector address data is produced.

9. An image data processing apparatus as claimed in claim 1 wherein the storage address system is a sequential storage address system.

10. An image data processing apparatus as claimed in claim 9 wherein the body image data represents body slices and the viewable image is a selected slice through the body slices or a selected three-dimensional view of a portion of the body or body part represented by the body image data.

11. A medical image data processing system, comprising:
   a first address generator including
      a first coordinate data producing unit for producing a first three-dimensional vector address representing first three-dimensional body image data with first addresses adjoining to the first three-dimensional vector address in response to initial parameter data,
      a first coordinate data converting unit for converting the first three-dimensional vector address and the first adjoining addresses into at least first one-dimensional vector address, and
      a first control unit for controlling a displacement of the first one-dimensional vector data obtained from the first coordinate data converting unit;
   a second address generator including
      a second coordinate data producing unit for producing a second three-dimensional vector address representing second three-dimensional body image data with second addresses adjoining to the second three-dimensional vector address in response to initial parameter data,
      a second coordinate data converting unit for converting the second three-dimensional vector address and the second adjoining addresses into at least second one-dimensional vector address, and a second control unit for controlling a displacement of the second one-dimensional vector data obtained from the second coordinate data converting unit;

a first address bus for coupling said first address generator to a first storage means for storing the first three-dimensional body image data; and a second address bus for coupling said second address generator to a second storage means for storing the second three-dimensional body image data;

wherein said first and second initial parameter data are provided by a calculation means to said first and second address generators.

* * * * *